(12) United States Patent
Wang

(10) Patent No.: US 7,886,855 B2
(45) Date of Patent: Feb. 15, 2011

(54) FOLDING AND FIXING DEVICE FOR A SEAT OF AN ELECTRIC WALK-SUBSTITUTING VEHICLE

(76) Inventor: Arthur Wang, No. 22, Bengong 5th Road, Kang Shan Town, Kaohsiung County (TW)

( * ) Notice: Subject to any disclaimer, the term of this patent is extended or adjusted under 35 U.S.C. 154(b) by 207 days.

(21) Appl. No.: 12/320,145

(22) Filed: Jan. 21, 2009

(65) Prior Publication Data

US 2010/0181124 A1 Jul. 22, 2010

(51) Int. Cl.
*B60N 2/04* (2006.01)
(52) U.S. Cl. ...................... 180/65.1; 180/907
(58) Field of Classification Search ............... 180/65.1, 180/907, 908; 280/642, 650, 304.1, 304.2; 297/53
See application file for complete search history.

(56) References Cited

U.S. PATENT DOCUMENTS

| | | | | |
|---|---|---|---|---|
| 6,050,356 A | * | 4/2000 | Takeda et al. | 180/65.1 |
| 6,866,109 B2 | * | 3/2005 | Roach | 180/65.1 |
| 7,124,849 B2 | * | 10/2006 | Huang | 180/208 |
| 7,159,681 B1 | * | 1/2007 | Sauve | 180/208 |
| 7,174,093 B2 | * | 2/2007 | Kidd et al. | 388/811 |
| 7,451,848 B2 | * | 11/2008 | Flowers et al. | 180/208 |
| 7,455,362 B2 | * | 11/2008 | Hanson et al. | 297/363 |
| 7,703,567 B2 | * | 4/2010 | Wang | 180/208 |

* cited by examiner

*Primary Examiner*—J. Allen Shriver, II
*Assistant Examiner*—Bridget Avery
(74) *Attorney, Agent, or Firm*—Rosenberg, Klein & Lee

(57) ABSTRACT

An electric walk-substituting vehicle includes a chassis, a seat assembly pivoted on upper ends of the connecting rods, a pivotal steering mechanism, and a folding and fixing device, which will fix the connecting rods after the seat assembly is moved to either of raised in-use and lowered not-in-use positions; the seat assembly includes connecting rods pivoted on the chassis; the folding and fixing device includes two position-limiting plates, which are secured on the connecting rods to pivot together with the connecting rods; the position-limiting plates each have first and second holes; the folding and fixing device includes a pressing and moving mechanism with two insertion rods; the insertion rods will pass into the first holes to engage the position-limiting plates after the connecting rods are pivoted to the raised in-use position; the insertion rods will pass into the second holes after the connecting rods are pivoted to the not-in-use position.

7 Claims, 10 Drawing Sheets

FOLDING AND FIXING DEVICE FOR A SEAT OF AN ELECTRIC WALK-SUBSTITUTING VEHICLE

BACKGROUND OF THE INVENTION

1. Field of the Invention

The present invention relates to a folding and fixing device for a seat of an electric walk-substituting vehicle, more particularly one, which allows the seat to be easily moved between a raised in-use position and a lowered not-in-use one, and can fix the seat after the seat is moved to either one of the raised in-use and the lowered not-in-use positions; the walk-substituting vehicle can be easily dragged like a luggage trolley after it is folded to occupy much less space.

2. Brief Description of the Prior Art

A person is prone to suffer from muscular dystrophy of the legs and physiological deterioration, and become unable to stand up or walk by himself/herself after he/she becomes very old, has injured lower limbs as the result of a traffic accident, has been bedridden for a long time or gets serious sickness such as paralysis of the lower half of the body. Consequently, such a person has to use a crutch or wheelchair to help him/her move. However, crutches can only help those people who still can walk by themselves, and the users still can't move rapidly or a long distance if they have the above-mentioned physical problems. And, it will take one relatively much labor to move a conventional wheelchair when he/she is sitting on the wheelchair.

Therefore, the industry developed various man-carrying vehicles such as electric walk-substituting carts and electric wheelchairs for use by the elderly and physically disabled persons.

However, most of currently-existing man-carrying vehicles can't be reduced or folded to occupy less space for easy transportation and storage. Consequently, such man-carrying vehicles aren't convenient to use.

To overcome the above-mentioned problem, the industry developed a separable man-carrying vehicle, which can be separated into several major components by the users. However, it still takes a certain amount of time and labor to separate the vehicle. Therefore, such a man-carrying vehicle isn't convenient to use, either.

Therefore, it is a main object of the present invention to provide an improvement on an electric walk-substituting vehicle to overcome the above problems.

SUMMARY OF THE INVENTION

An electric walk-substituting vehicle in accordance with an embodiment of the present invention includes a chassis, connecting rods pivoted on the chassis, a seat assembly pivoted on upper ends of the connecting rods, a pivotal steering mechanism, and a folding and fixing device, which will fix the connecting rods after the seat assembly is moved to either of raised in-use and lowered not-in-use positions. The chassis includes a main part, and a footrest pivoted to the main part.

The seat assembly includes a seat, and a backrest pivoted on the seat; the seat has a pivotal piece with a propping edge while the backrest has a protrusion with a propped edge; the backrest is pivoted on the pivotal piece of the seat at the protrusion thereof; the propped edge of the backrest will contact the propping edge of the seat when the backrest is in an in-use position.

The folding and fixing device includes a pressing and moving mechanism, and two position-limiting plates, which are secured on the connecting rods to pivot together with the connecting rods. The plates each have first and second fixing holes; the pressing and moving mechanism has two insertion rods, which will pass into the first holes to engage the position-limiting plates after the connecting rods are pivoted to the raised in-use position; the insertion rods will pass into the second holes after the connecting rods are pivoted to the not-in-use position.

The vehicle should be folded by means of the following steps: the steering mechanism is pivoted downwards and received in the chassis; the footrest part is pivoted to be close to a bottom of the main part; the backrest is pivoted downwards to be close to the seat; finally, the connecting rods are pivoted downwards to be close to the main part of the chassis together with the seat assembly. The vehicle can be easily dragged like a luggage trolley when it is in the folded configuration.

The seat assembly further includes a fast-to-unfasten mechanism, which can be moved to a fastening position to prevent the backrest from moving relative to the seat, and which can be easily moved to an unfastening position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
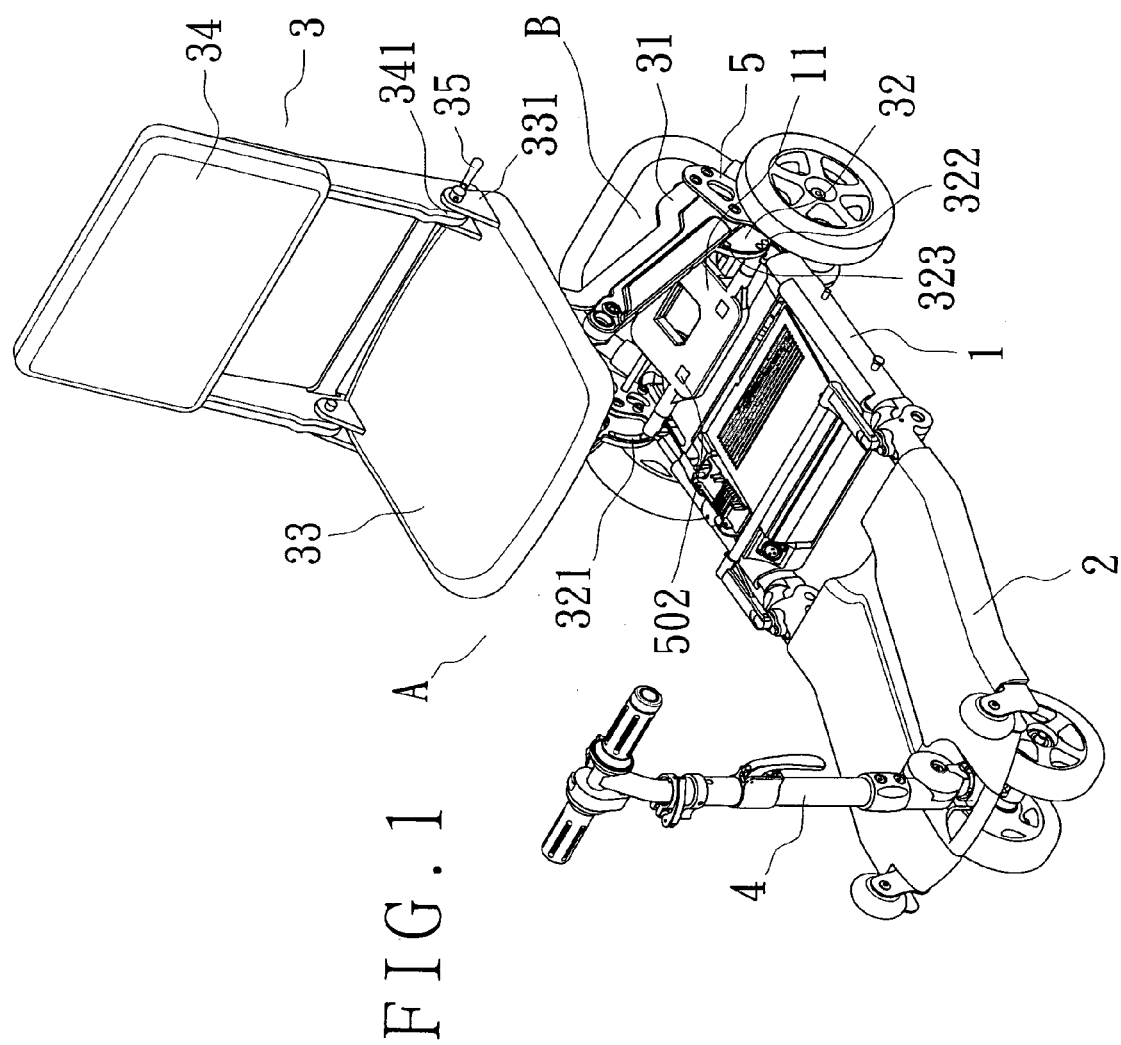
FIG. 1 is a perspective view of the walk-substituting vehicle of the present invention in the unfolded in-use configuration.
Figure 2:
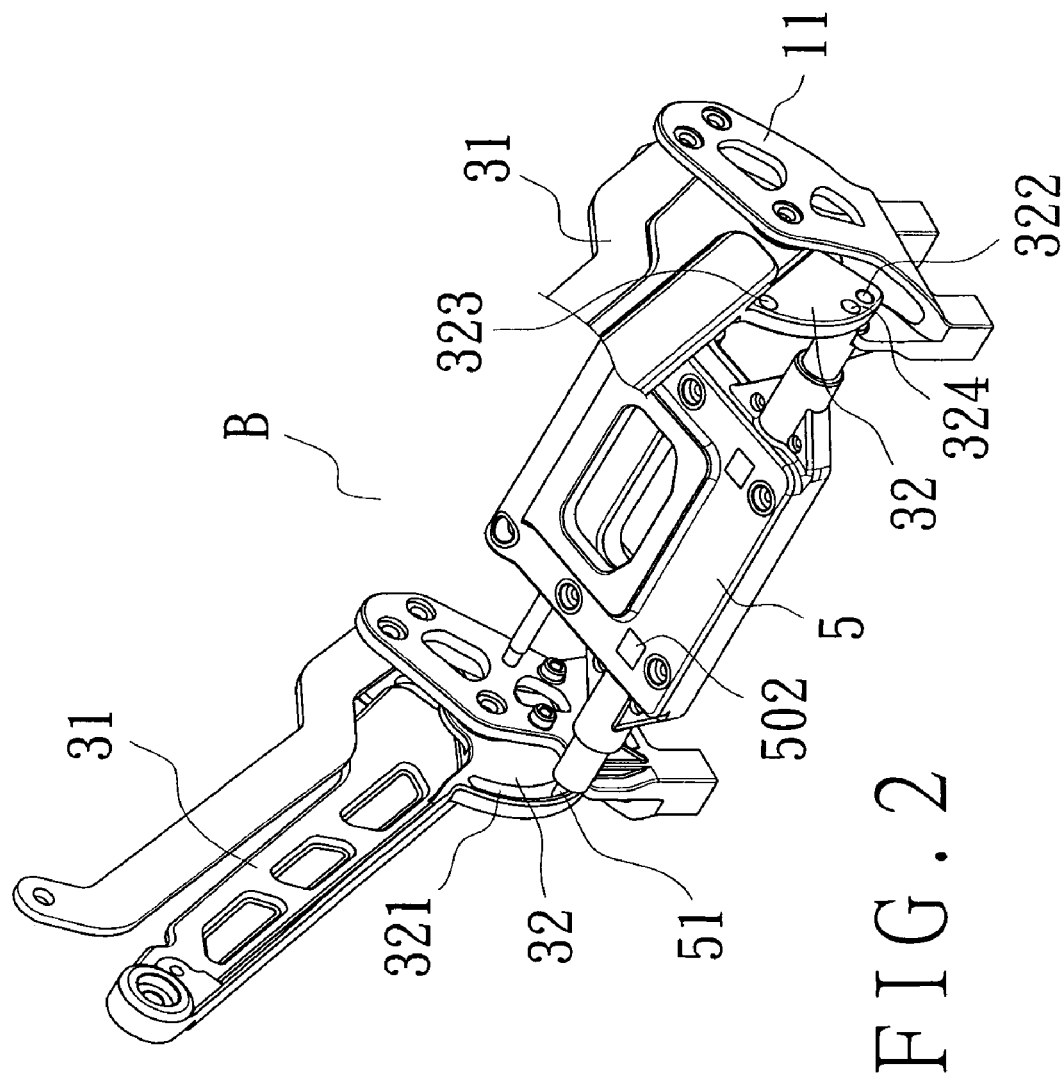
FIG. 2 is a perspective view of the folding and fixing device of the vehicle in FIG. 1, taken when the vehicle is in the unfolded configuration.
Figure 6:
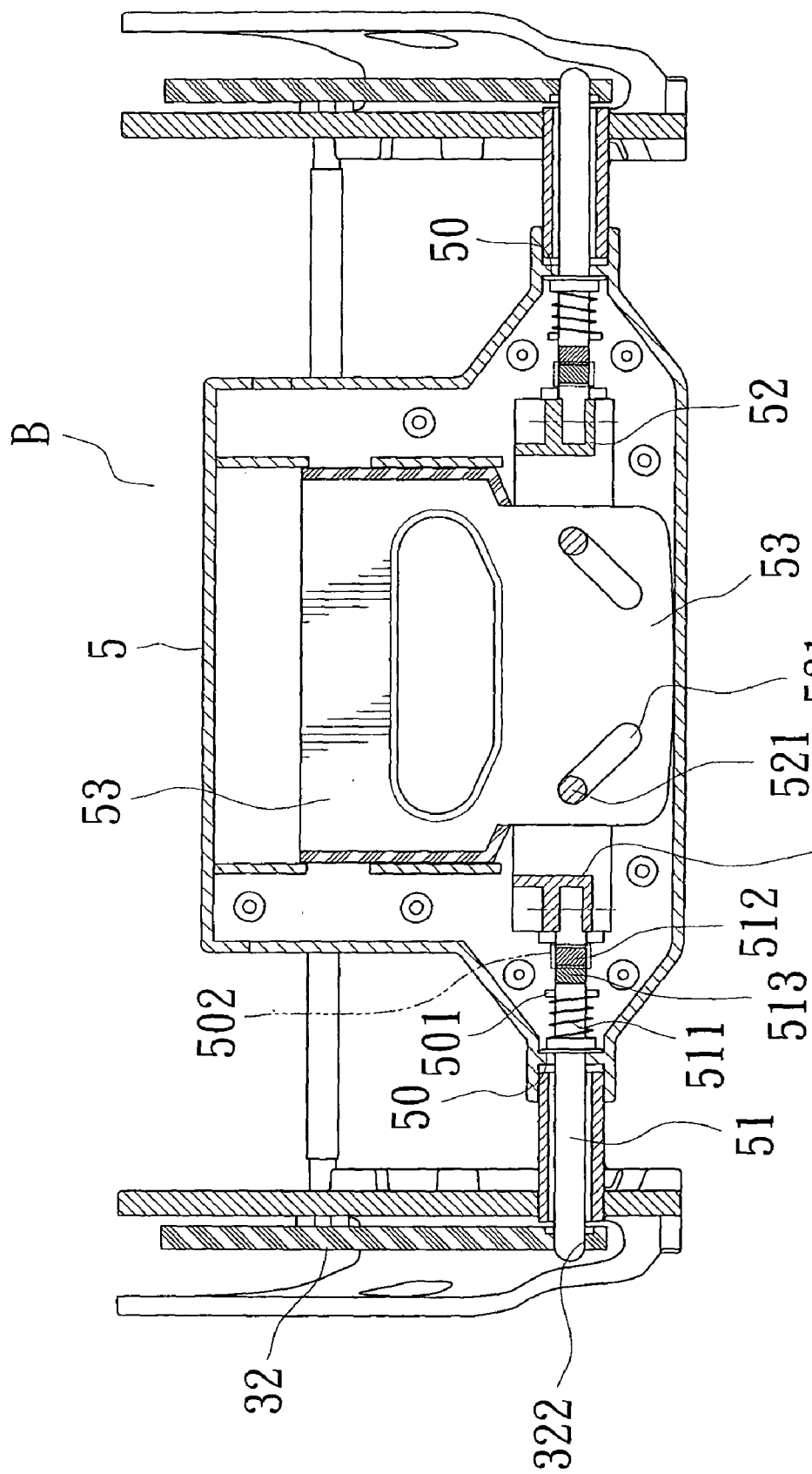
FIG. 6 is a sectional view of the folding and fixing device.
Figure 7:
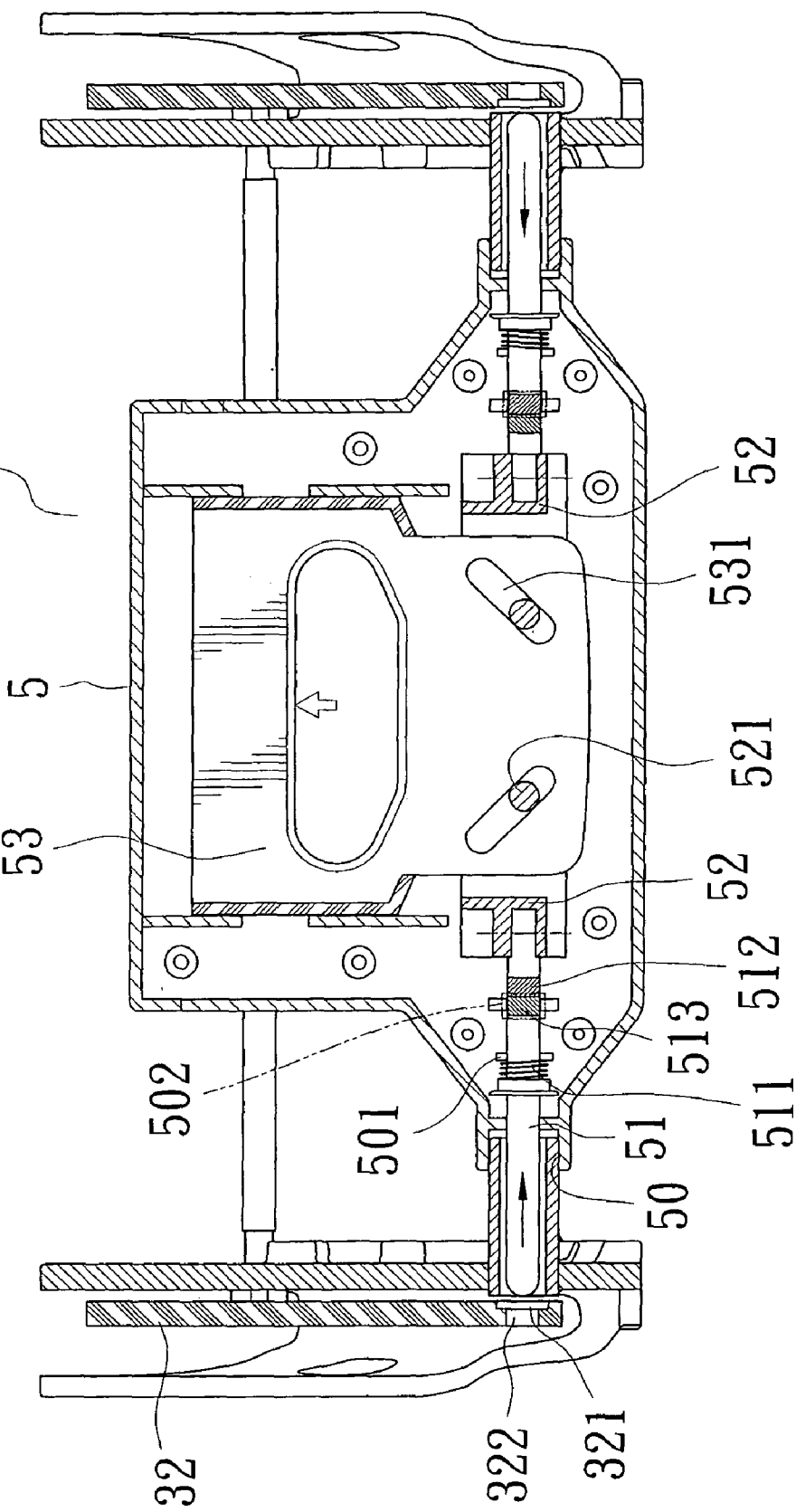
FIG. 7 is a sectional view of the folding and fixing device in motion.
Figure 9:
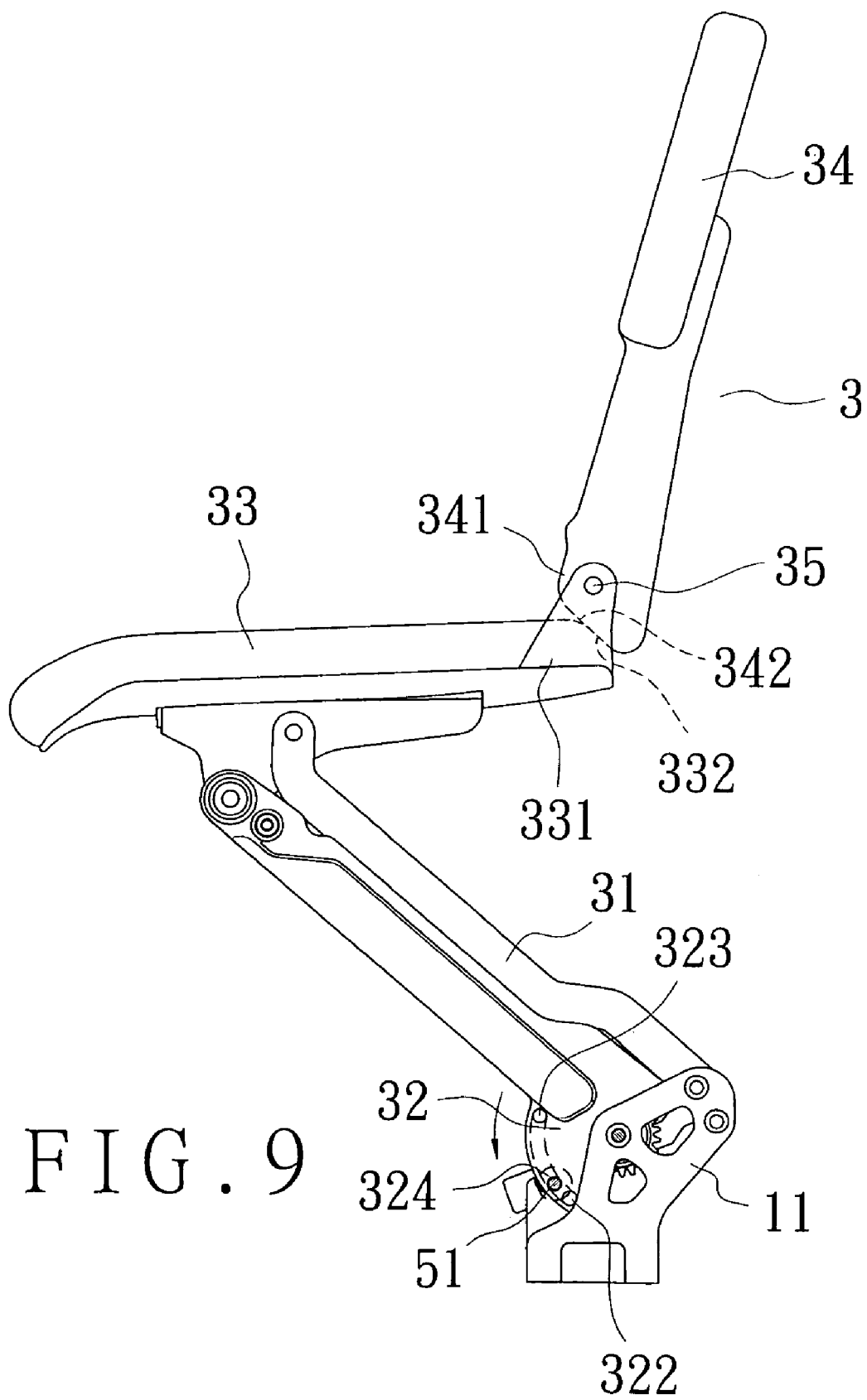
FIG. 9 is a side view of the seat assembly of the vehicle.
Figure 10:
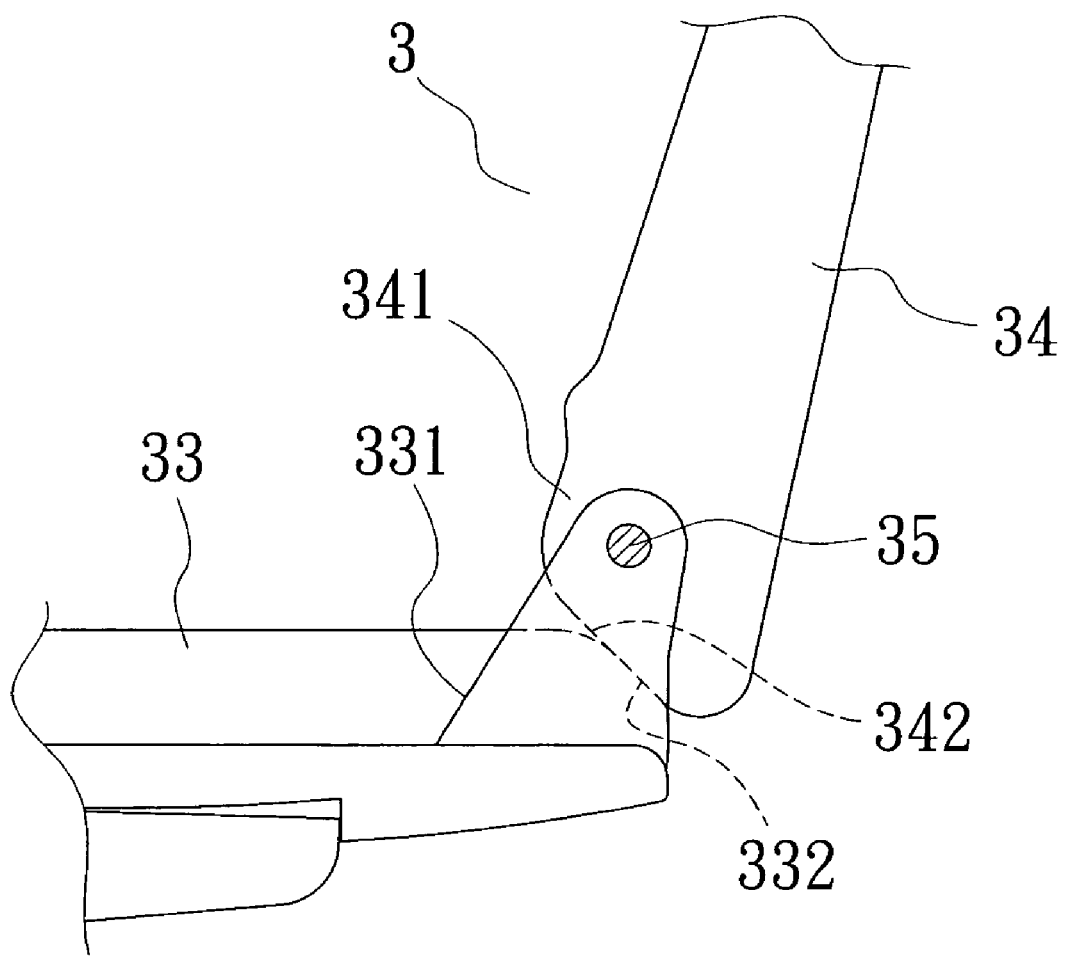
FIG. 10 is a partial side view of the seat assembly.

Referring to FIGS. 1, 2 and 6, a preferred embodiment (A) of an electric walk-substituting vehicle of the present invention consists of:

a chassis; the chassis includes a main part 1 and a footrest part 2 pivotally connected to the main part 1; there are two joining components 11, which are fixed on two sides of the main part 1 of the chassis respectively;

a seat assembly 3, which is positioned above the main part 1 of the chassis so as to be movable between a raised in-use position and a lowered not-in-use one; referring to FIGS. 9 and 10, the seat assembly 3 consists of two connecting rods 31, a seat 33, a backrest 34, and a fast-to-unfasten mechanism 35; the connecting rods 31 are each pivotally connected at a lower end thereof to one of the joining components 11 fixed on the main part 1 of the chassis; the seat 33 is pivotally connected to upper ends of the connecting rods 31; the seat 33 and the backrest 34 are pivoted together; the seat 33 has a pivotal piece 331 on a rear end thereof; the backrest 34 has a protrusion 341 on a lower end thereof, and it is pivoted on the pivotal piece 331 of the seat 33 at the protrusion 341; the fast-to-unfasten mechanism 35 is joined on a pivotal joint between the seat 33 and the backrest 34; the fast-to-unfasten mechanism 35 can be moved to a fastening position to fix the backrest 34 to the seat 33, and it can be easily moved to an unfastening position, in which position the backrest 34 is free to pivot relative to the seat 33; furthermore, the pivotal piece 331 of the seat 33 has a propping edge 332, and the protrusion 341 of the backrest 34 has a propped edge 342, which will contact the propping edge 332 of the seat 33 for the backrest 34 to be steady when the backrest 34 is in an erected position;

a steering mechanism 4 pivoted on a front end of the footrest part 2 of the chassis; and a folding and fixing device (B) installed between the seat assembly 3 and the main part 1 of the chassis; the folding and fixing device (B) will fix the seat assembly 3 after the seat assembly 3 is moved to either one of the raised and the lowered positions; the folding and fixing device (B) includes:

(a) two position-limiting plates 32, which are each securely joined on a lower end of one of the connecting rods 31; each of the position-limiting plates 32 has a curved groove 321 on an inward side thereof, and first, second and third fixing holes 322, 323 and 324, which are formed on an outward side of the position-limiting plate 32, and communicate with the curved groove 321; the first fixing hole 322 is on a front end of the curved groove 321; the second fixing hole 323 is on a rear end of the curved groove 321; the third fixing hole 324 is on the curved groove 321 and between the first and the second fixing holes 322 and 323;

(b) a pressing and moving mechanism 5 interposed between the joining components 11; the pressing and moving mechanism 5 has a shell, which has an outlet 50 on each of two sides thereof; the mechanism 5 has an inner stopping piece 501 facing each of the outlets 50, and an insertion rod 51 passed through each of the outlets 50; an elastic element 511 is positioned around each of the insertion rods 51 and between the corresponding outlet 50 and stopping piece 501 so that the insertion rod 51 is biased to stick out from the outlet 50 of the shell with the elastic element 511; the insertion rods 51 are normally forced to move through the curved grooves 321 and stay in the fixing holes 322, 323 or 324 of the position-limiting plates 32 to fix the connecting rods 31 owing to the elastic elements 511; the seat assembly 3 will be in a first raised in-use position when the insertion rods 51 are passed into the first fixing holes 322; the seat assembly 3 will be in a second raised in-use position when the insertion rods 51 are passed into the third fixing holes 324; the seat assembly 3 will be in a lowered not-in-use position when the insertion rods 51 are passed into the second fixing holes 323;

the pressing and moving mechanism 5 has two co-moving components 52, which are joined to inner ends of the insertion rods 51 respectively; each of the co-moving components 52 has a raised portion 521;

the pressing and moving mechanism 5 has a moving member 53 between the co-moving components 52; the moving member 53 has two guiding slots 531, and the raised portions 521 of the co-moving components 52 are held in the guiding slots 531 respectively; a person can move the co-moving components 52 so as to withdraw the insertion rods 51 from the fixing holes 322, 323 or 324 of the position-limiting plates 32 by means of moving the moving member 53; referring to FIG. 6, the raised portions 521 of the co-moving components 52 will be received in upper ends of the guiding slots 531 if the user doesn't apply force to the moving member 53; referring to FIG. 7, the moving member 53 will exert force on the raised portions 521 so as to move the co-moving components 52 further away from the outlets 50, and in turn the raised portions 521 will be relocated in lower ends of the guiding slots 531 of the moving member 53 as soon as the moving member 53 is forced to change position by the user, thus withdrawing the insertion rods 51 from the fixing holes 322, 323 or 324 of the position-limiting plates 32; the connecting rods 31 can be pivoted relative to the joining components 11 after the insertion rods 51 are withdrawn from the fixing holes 322, 323 or 324 of the position-limiting plates 32.

Referring to FIGS. 1, 2 and 6, after the walk-substituting vehicle (A) is unfolded for use with the steering mechanism 4 being in an erected position, and with the seat assembly 3 being in the first raised in-use position, the insertion rods 51 will pass into the first fixing holes 322 of the position-limiting plates 32 to fix the seat assembly 3.

Figure 3:
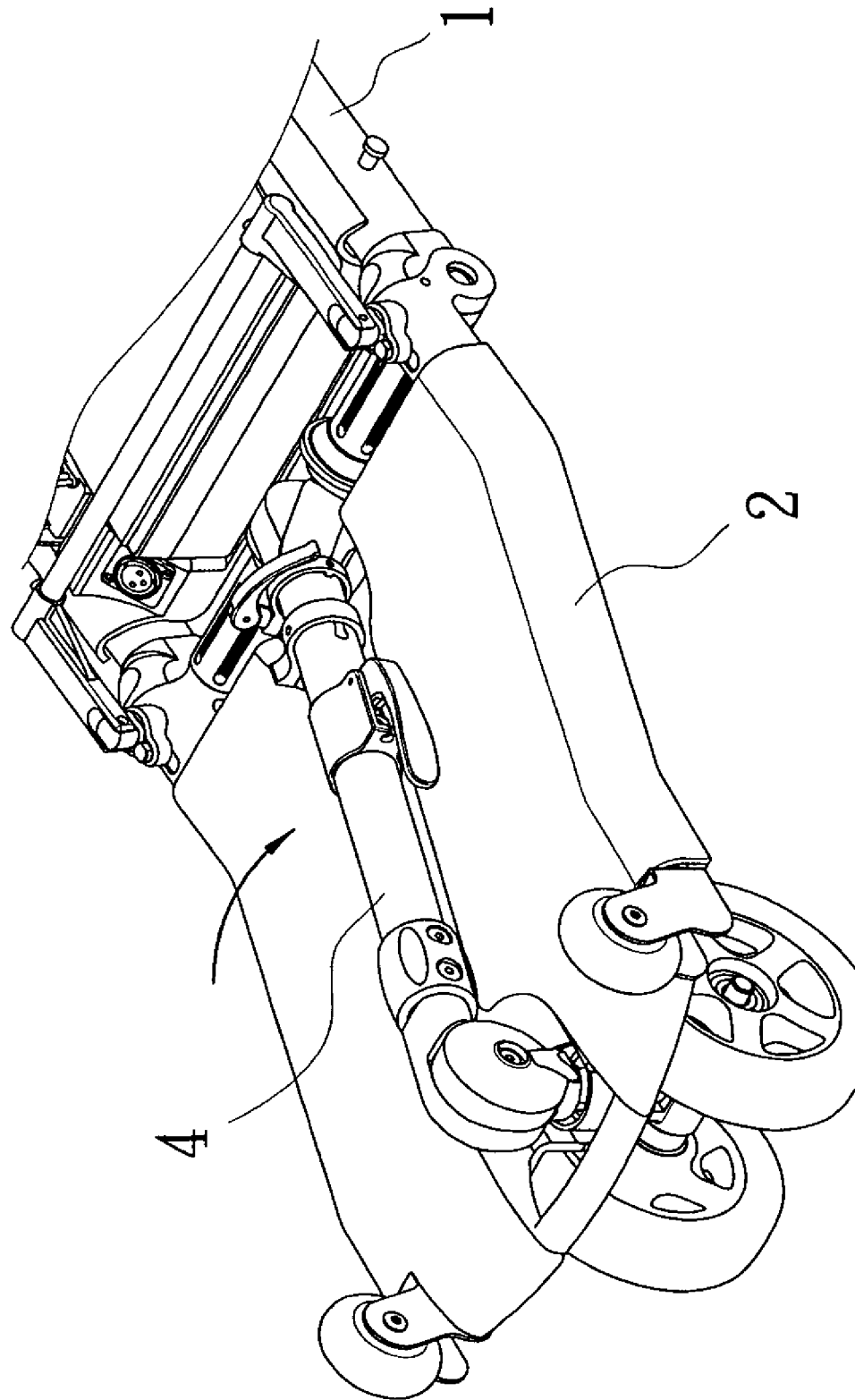
FIG. 3 is a perspective view of the walk-substituting vehicle of the present invention under a folding action (1)
Figure 4:
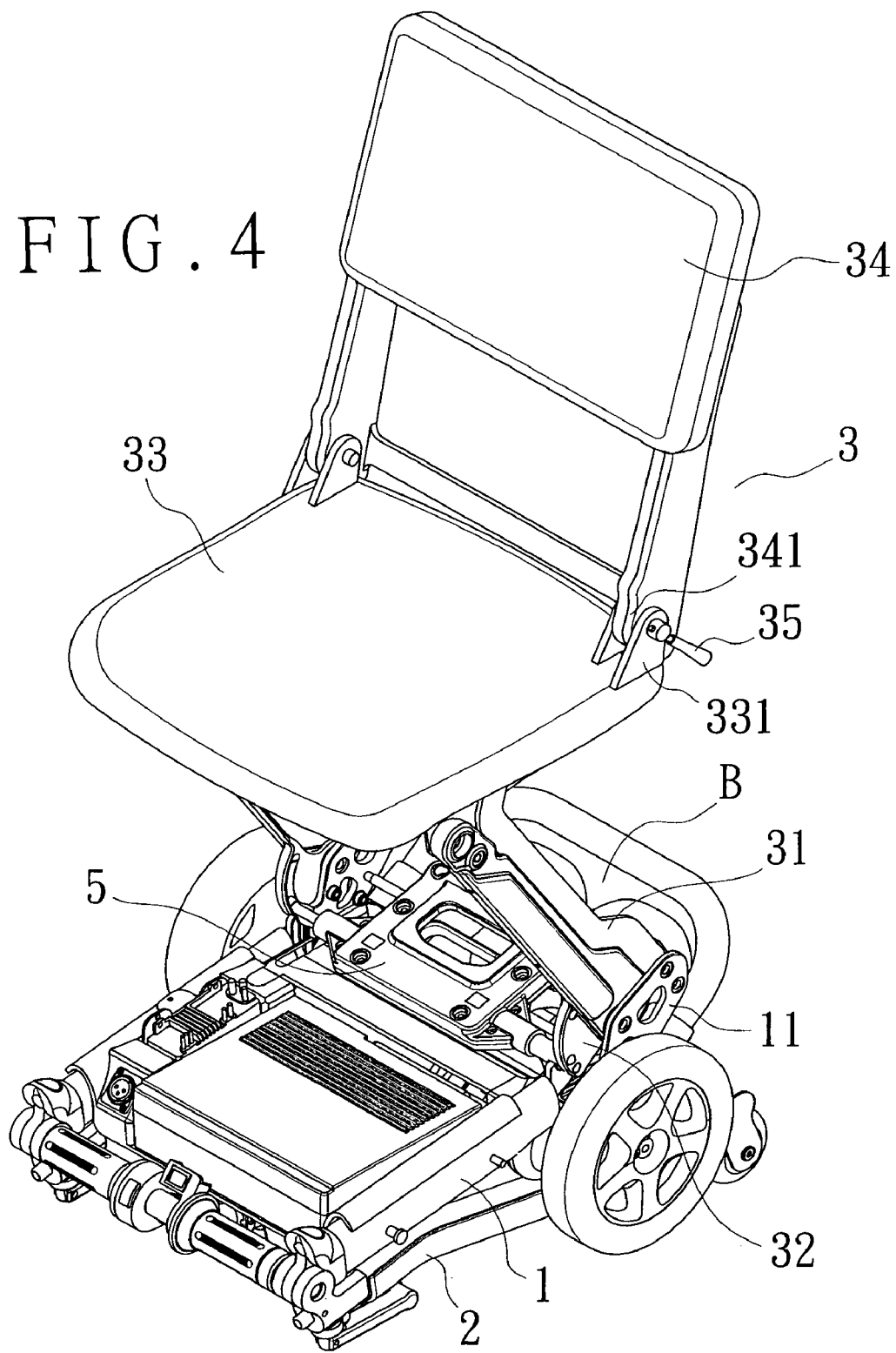
FIG. 4 is a perspective view of the walk-substituting vehicle of the present invention under a folding action (2)
Figure 5:
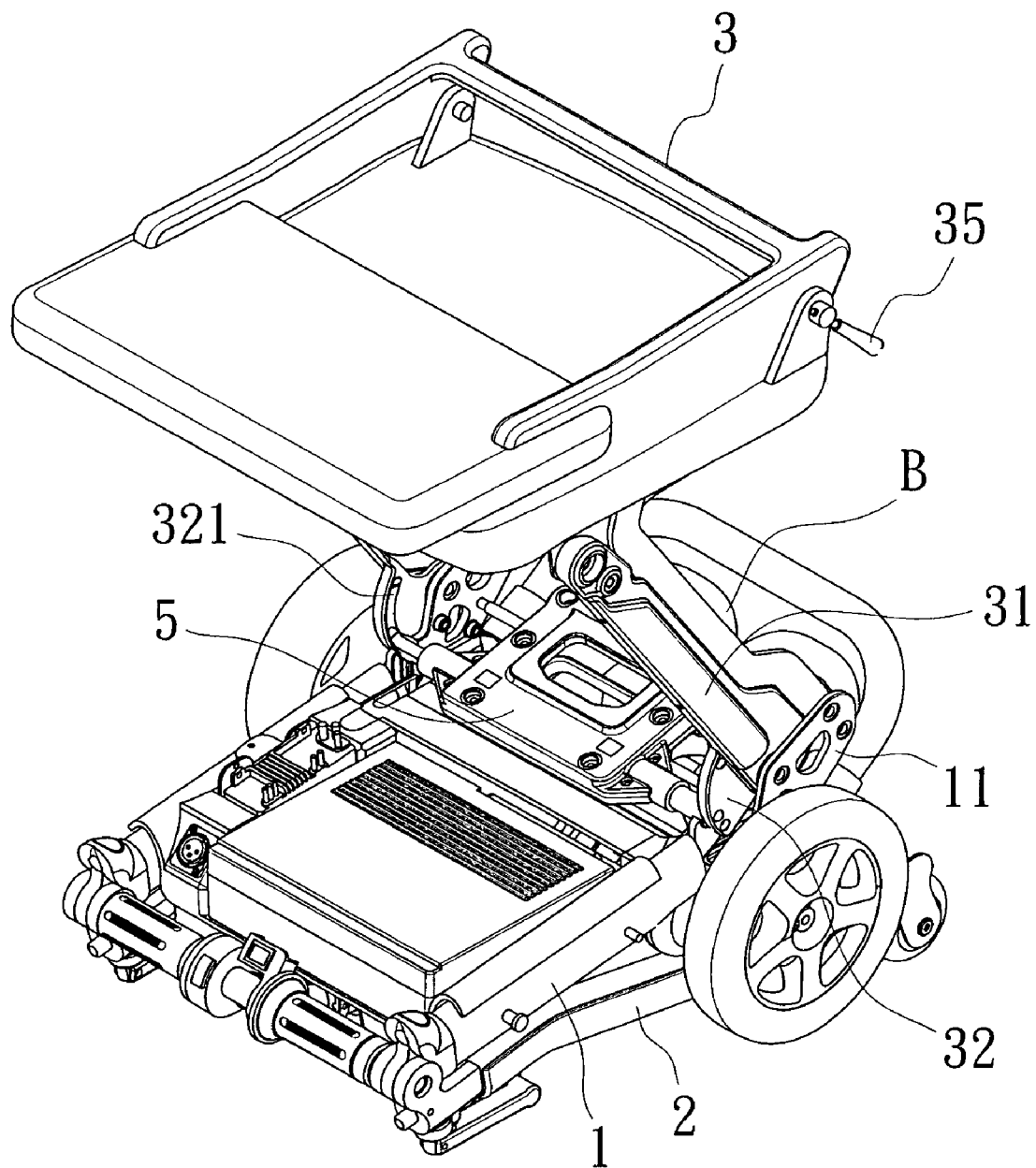
FIG. 5 is a perspective view of the walk-substituting vehicle of the present invention under a folding action (3)
Figure 8:
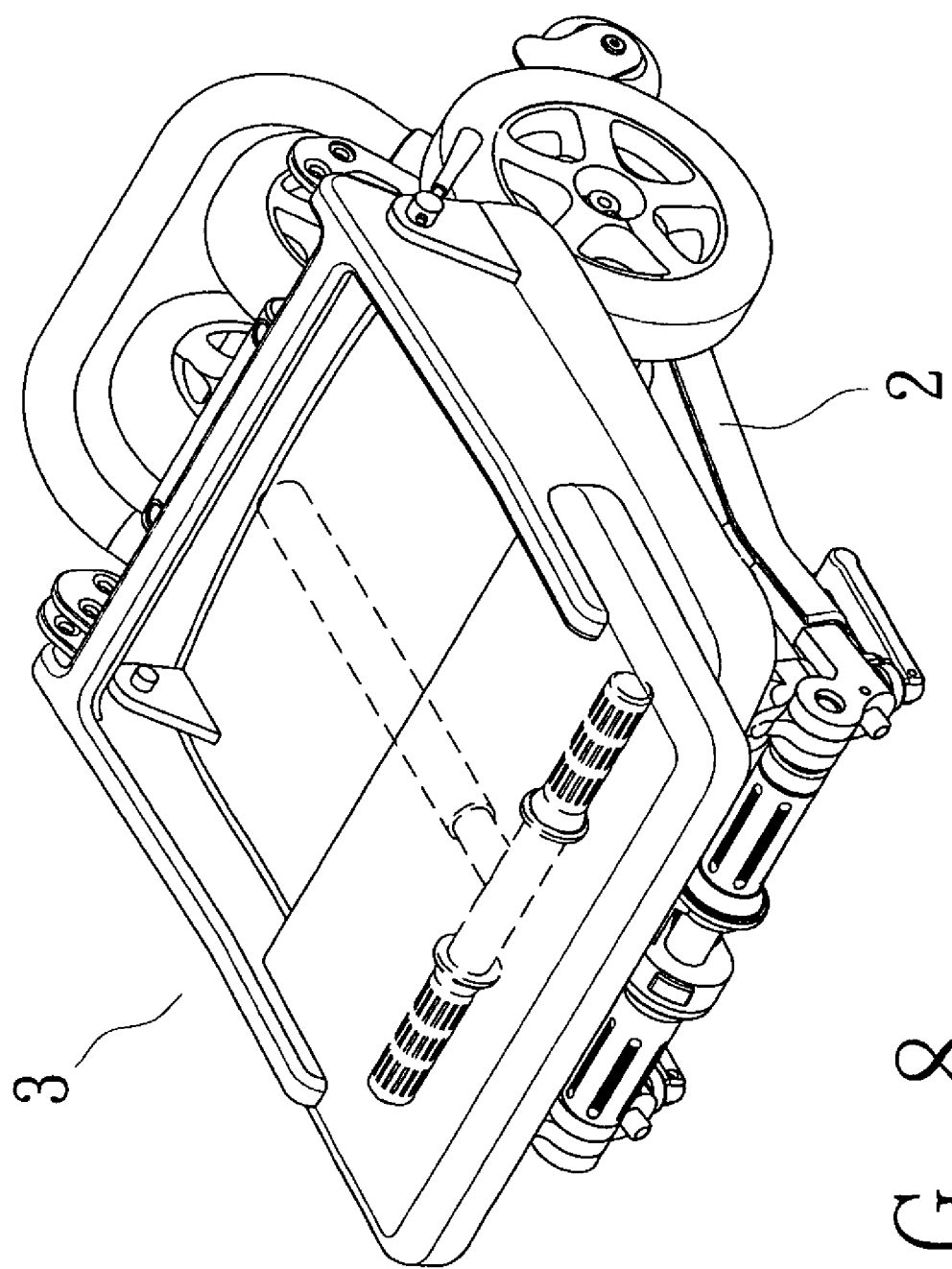
FIG. 8 is a perspective view of the walk-substituting vehicle of the present invention under a folding action (4)

FIG. 3 shows the walk-substituting vehicle (A) under a first step of the folding action: the steering mechanism 4 is pivoted downwards and received in the footrest part 2 of the chassis. FIG. 4 shows the walk-substituting vehicle (A) under a second step of the folding action: the footrest part 2 is pivoted so as to be close to a bottom of the main part 1 of the chassis. FIG. 5 shows the walk-substituting vehicle (A) under a third step of the folding action: the backrest 34 is pivoted downwards to be close to the seat 33 after the fast-to-unfasten mechanism 35 is moved to the unfastening position. FIG. 8 shows the walk-substituting vehicle (A) under a final step of the folding action: the connecting rods 31 are pivoted downwards to be close to the main part 1 of the chassis together with the seat assembly 3 after the moving member 53 is moved to withdraw the insertion rods 51 from the first fixing holes 322 or the third fixing holes 324 of the position-limiting plates 32. After the vehicle (A) is completely folded and the user stops exerting force on the moving member 53, the elastic elements 511 will stretch from the compressed position so as to make the insertion rods 51 pass into the second fixing holes 323 of the position-limiting plates 32; thus, the vehicle occupies much less space to be easy to store and transport, and the connecting rods 31 are fixed in position. The vehicle can be easily dragged like a luggage trolley when it is in the folded configuration as shown in FIG. 8.

Furthermore, the shell of the pressing and moving mechanism 5 has two observation holes 502 thereon, and each of the insertion rods 51 has first and second sections 512 and 513, which are different colors; the first sections 512 will face the observation holes 502 respectively when the insertion rods 51 pass into the fixing holes 322, 323 or 324 of the position-limiting plates 32; the second sections 513 will face the observation holes 502 respectively when the insertion rods 51 are withdrawn from the fixing holes 322, 323 or 324. Therefore, the user can make sure that the insertion rods 51 are inserted in the fixing holes 322, 323 or 324 to effectively fix the connecting rods 31 by means of seeing the color exposed through the observation holes 502, thus preventing accidents.

Referring to FIG. 9, the position-limiting plates 32 each have plural third fixing holes 324 between the first and the second fixing holes 322 and 323 thereof; thus, the seat assembly 3 can be fixed in any of several different heights.

From the above description, it can be seen that the electric walk-substituting vehicle of the present invention has the following advantages over the prior arts:

1. The insertion rods of the pressing and moving mechanism of the folding and fixing device of the vehicle will automatically pass into the fixing holes of the position-limiting plates so as to fix the connecting rods, on which the seat assembly is supported, after the connecting rods are pivoted between in-use and not-in-use positions relative to the main part of the chassis. In other words, the seat assembly can be fixed in any of several different positions.

2. The connecting rods can be easily unfastened merely by means of pressing the pressing and moving mechanism of the folding and fixing device; the connecting rods will be automatically fixed again as soon as the user stops pressing the pressing and moving mechanism. Therefore, the present invention is convenient to use.

3. The fast-to-unfasten mechanism of the seat assembly is easy to move between fastening and unfastening positions, and it can prevent the backrest from moving relative to the seat part after it is moved to the fastening position.

4. The backrest is pivoted on the rear pivotal piece of the seat at its protrusion; the pivotal piece of the seat has a propping edge, and the protrusion of the backrest has a propped edge, which will contact the propping edge when the backrest is in an erected position. Therefore, the backrest is very steady.

What is claimed is:

1. A folding and fixing device for a seat of an electric walk-substituting vehicle,
   the electric walk-substituting vehicle comprising:
   a chassis; the chassis includes a main part and a footrest part pivotally connected to the main part; the main part of the chassis having a joining component fixed on each of two sides thereof;
   a seat assembly positioned above the main part of the chassis; the seat assembly being positioned above the main part of the chassis so as to be movable between a raised in-use position and a lowered not-in-use one; the seat assembly including two connecting rods, which are each pivotally connected at a lower end thereof to one of the joining components on the main part of the chassis;
   a steering mechanism pivoted on a front end of the footrest part of the chassis; and
   a folding and fixing device for fixing the seat assembly;
   the folding and fixing device fixing the seat assembly after the seat assembly is moved to a chosen one of the raised in-use and the lowered not-in-use positions; the folding and fixing device including:
   (a) two position-limiting plates, which are each securely joined on a lower end of one of the connecting rods of the seat assembly; each of the position-limiting plates having a curved groove on one side thereof, and first and second fixing holes, which are formed on another side of the position-limiting plate, and communicate with the curved groove; and
   (b) a pressing and moving mechanism interposed between the joining components fixed on the main part of the chassis; the pressing and moving mechanism having plural insertion rods; the insertion rods passing into corresponding said fixing holes of the position-limiting plates through the curved grooves so as to fix the connecting rods of the seat assembly after the seat assembly is moved to a chosen one of the raised in-use and the lowered not-in-use positions.

2. The folding and fixing device for a seat of an electric walk-substituting vehicle as claimed in claim 1, wherein the pressing and moving mechanism has:
   an outlet on each of two sides thereof;
   an inner stopping piece facing each of the outlets; the insertion rods being each passed through a corresponding said outlet;
   an elastic element positioned around each of the insertion rods and between a corresponding said outlet and a corresponding said stopping piece; the insertion rods being biased to stick out from the outlets so as to engage the position-limiting plates at first ends thereof by means of the elastic elements;
   two co-moving components, which are joined to other ends of the insertion rods respectively; each of the co-moving components having a raised portion; and
   a moving member for causing motion of the co-moving components; the moving member having two guiding slots; the raised portions of the co-moving components being held in the guiding slots of the moving member respectively.

3. The folding and fixing device for a seat of an electric walk-substituting vehicle as claimed in claim 1, wherein the pressing and moving mechanism has two observation holes, and each of the insertion rods has first and second sections, which are different colors; the first sections of the insertion rods being exposed through said observation holes respectively when the insertion rods are engaged with the position-limiting plates; the second sections of the insertion rods being exposed through said observation holes respectively when the insertion rods are disengaged from the position-limiting plates.

4. The folding and fixing device for a seat of an electric walk-substituting vehicle as claimed in claim 1, wherein the seat assembly includes a seat, a backrest, and a fast-to-unfasten mechanism; the backrest being pivoted on the seat; the fast-to-unfasten mechanism being movable to a fastening position to prevent the backrest from moving relative to the seat.

5. The folding and fixing device for a seat of an electric walk-substituting vehicle as claimed in claim 1, wherein the seat assembly includes a seat, and a backrest pivoted on the seat;
   the seat having a pivotal piece; the backrest having a protrusion; the backrest being pivoted on the pivotal piece of the seat at the protrusion thereof; the pivotal piece of the seat having a propping edge; the protrusion of the backrest having a propped edge to contact the propping edge of the seat.

6. The folding and fixing device for a seat of an electric walk-substituting vehicle as claimed in claim 1, wherein each of the position-limiting plates has a plurality of third fixing holes between the first and the second fixing holes thereof for allowing the seat assembly to be adjusted in position.

7. The folding and fixing device for a seat of an electric walk-substituting vehicle as claimed in claim 2, wherein the pressing and moving mechanism has two observation holes, and each of the insertion rods has first and second sections, which are different colors; the first sections of the insertion rods being exposed through said observation holes respectively when the insertion rods are engaged with the position-limiting plates; the second sections of the insertion rods exposed through said observation holes respectively when the insertion rods are disengaged from the position-limiting plates.

* * * * *